US008666122B2

(12) United States Patent
Yan et al.

(10) Patent No.: US 8,666,122 B2
(45) Date of Patent: Mar. 4, 2014

(54) ASSESSING BIOMETRIC SAMPLE QUALITY USING WAVELETS AND A BOOSTED CLASSIFIER

(71) Applicant: Lockheed Martin Corporation, Bethesda, MD (US)

(72) Inventors: Weizhong Yan, Clifton Park, NY (US); Frederick W. Wheeler, Niskayuna, NY (US); Peter H. Tu, Niskayuna, NY (US); Xiaoming Liu, Schenectady, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 13/760,670

(22) Filed: Feb. 6, 2013

(65) Prior Publication Data

US 2013/0148866 A1 Jun. 13, 2013

Related U.S. Application Data

(62) Division of application No. 12/457,959, filed on Jun. 26, 2009, now Pat. No. 8,442,279.

(60) Provisional application No. 61/076,326, filed on Jun. 27, 2008.

(51) Int. Cl.
 *G06K 9/00* (2006.01)
 *G07C 9/00* (2006.01)

(52) U.S. Cl.
 CPC .................. *G07C 9/00158* (2013.01)
 USPC ............... 382/115; 382/155; 382/159

(58) Field of Classification Search
 CPC ............ G07C 9/00158; G07C 9/0087; G06K 9/00885; G06K 2009/00932; G06F 21/32
 USPC .................................. 382/115, 124
 See application file for complete search history.

(56) References Cited

U.S. PATENT DOCUMENTS

| | | | |
|---|---|---|---|
| 2004/0066966 A1 | 4/2004 | Schneiderman | |
| 2005/0089246 A1 | 4/2005 | Luo | |
| 2005/0238207 A1* | 10/2005 | Tavares | 382/115 |
| 2006/0050933 A1 | 3/2006 | Adam et al. | |
| 2006/0110030 A1 | 5/2006 | Sung | |
| 2008/0107311 A1* | 5/2008 | Huang et al. | 382/118 |
| 2008/0232681 A1* | 9/2008 | Feris et al. | 382/159 |

OTHER PUBLICATIONS

Nandakumar et al, "Quality-based Score Level Fusion in Multibiometric Systems", 2006, IEEE, vol. 4, pp. 473-476.

Qi et al., "A Hybrid Method for Fingerprint Image Quality Calculation", Automatic Identification Advanced Technologies, 2005, 4th IEEE Workshop in Buffalo, NY, USA, Oct. 17-18, 2005 & Piscataway, NJ, USA, IEEE Oct. 17, 2005, pp. 124-129.

Grother, et al., "Performance of Biometric Quality Measures", IEEE Transactions on Pattern Analysis and Machine Intelligence, IEEE Service Center, Los Alamitos, CA, USA, vol. 29, No. 4, Apr. 1, 2007, pp. 531-543.

* cited by examiner

*Primary Examiner* — Edward Park
(74) *Attorney, Agent, or Firm* — Oblon, Spivak, McClelland, Maier & Neustadt, L.L.P.

(57) ABSTRACT

A biometric sample training device, a biometric sample quality assessment device, a biometric fusion recognition device, an integrated biometric fusion recognition system and example processes in which each may be used are described. Wavelets and a boosted classifier are used to assess the quality of biometric samples, such as facial images. The described biometric sample quality assessment approach provides accurate and reliable quality assessment values that are robust to various degradation factors, e.g., such as pose, illumination, and lighting in facial image biometric samples. The quality assessment values allow biometric samples of different sample types to be combined to support complex recognition techniques used by, for example, biometric fusion devices, resulting in improved accuracy and robustness in both biometric authentication and biometric recognition.

6 Claims, 15 Drawing Sheets

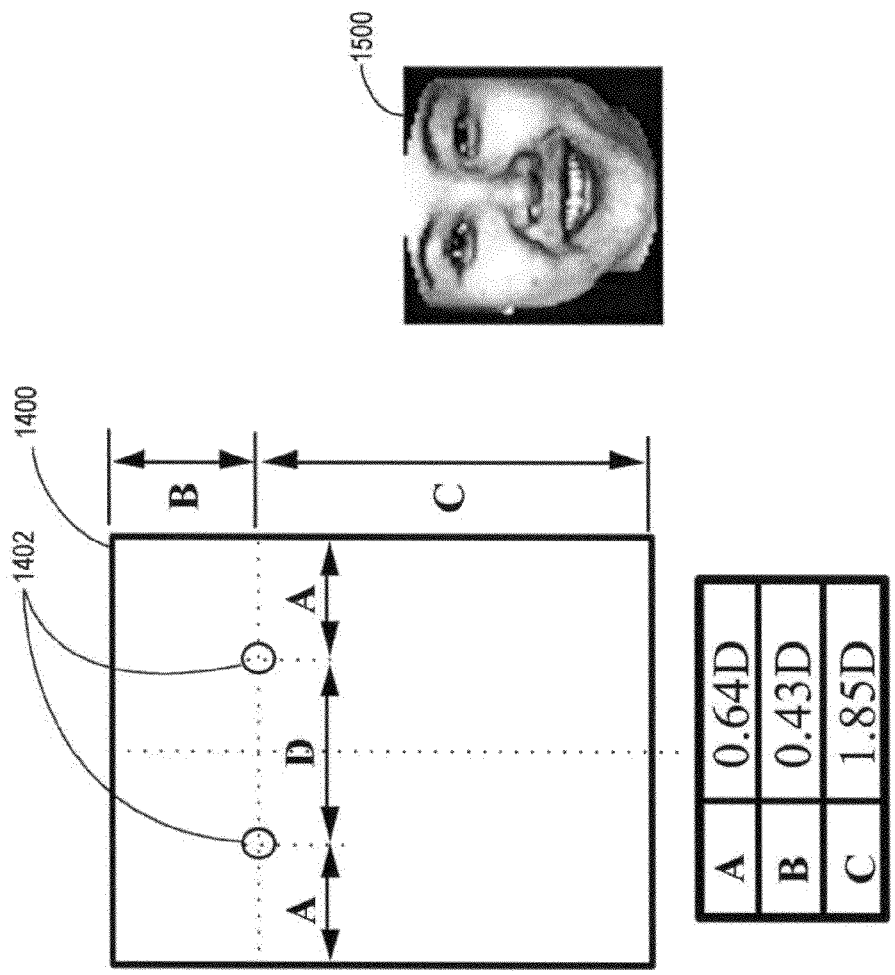
FIG. 15
FIG. 14
| A | 0.64D |
|---|---|
| B | 0.43D |
| C | 1.85D |
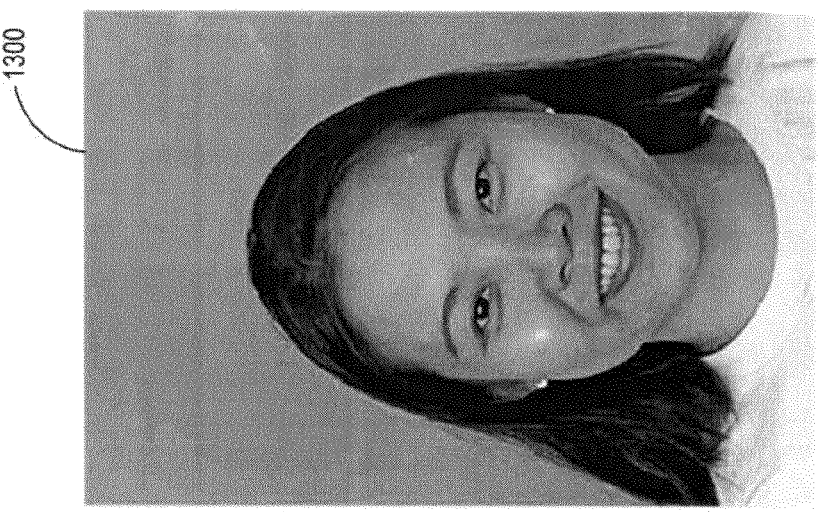
FIG. 13

ASSESSING BIOMETRIC SAMPLE QUALITY USING WAVELETS AND A BOOSTED CLASSIFIER

INCORPORATION BY REFERENCE

This application is a divisional of U.S. application Ser. No. 12/457,959 filed Jun. 26, 2009, which claims the benefit of U.S. Provisional Application No. 61/076,326, "A METHOD TO ASSESS FACIAL IMAGE QUALITY USING GABOR WAVELETS AND ADABOOST," filed by Weizhong Yan, Frederick Wheeler, Peter Tu and Xiaoming Liu on Jun. 27, 2008, each of which are incorporated herein by reference in its entirety.

BACKGROUND

Biometrics is the study of automated methods for uniquely associating humans with measurements of their intrinsic physical, biochemical, or behavioral traits, for example, fingerprints, face, iris, DNA, gait, etc. Biometric fusion, by intelligently combining information from multiple modalities in decision-making, has proven to be effective in improving accuracy and robustness in both biometric authentication and biometric recognition (identification and verification).

Knowing the quality of biometric samples via biometric quality assessment is useful in validating the quality of the acquired samples, and thus ensuring good recognition performance. More importantly, with assessed biometric quality scores available, quality-based biometric fusion, a more robust biometric fusion scheme, can be performed.

The quality of a biometric sample, e.g., a fingerprint image, a facial image, etc., can be assessed subjectively or objectively. While subjective assessment is based on human conception of biometric sample quality, objective assessment is to determine the quality algorithmically. With the number of applications for biometrics increasing, there is an increasing demand for more accurate and more robust recognition. Therefore, more effective objective quality assessment technologies are needed.

SUMMARY

A biometric sample training device, a biometric sample quality assessment device, a biometric fusion recognition device, an integrated biometric fusion recognition system and example processes in which each may be used are described. Aspects of the described embodiments relate to objective, or algorithmic, assessment of the quality of biometric samples. Specifically, aspects of the described embodiments relate to an approach that generates quality estimates, or quality assessment values, for biometric samples such as, for example, facial images, retina scans, and fingerprints. The estimated quality assessment values for individual biometric samples within a set of biometric samples, provides an indication of how well a biometric matching system working with the set of biometric samples will perform.

Aspects of the described embodiments provide a biometric sample quality assessment approach that uses technologies such as wavelets, e.g., Gabor wavelets, and a boosted classifier, e.g., an adaptive boosting, or AdaBoost, classifier, to assess a quality of biometric samples, such as facial image samples. According to described embodiments, wavelets and a boosted classifier may be used to algorithmically assess the quality of biometric samples, such as facial images. The described quality assessment approach provides accurate and reliable quality assessment values that are robust to various degradation factors such as, for example, facial expression or pose, illumination and lighting in facial image biometric samples in facial image biometric samples. The quality assessment values allow biometric samples of different sample types to be combined to support complex recognition techniques used by, for example, biometric fusion devices, resulting in improved accuracy and robustness in both biometric authentication and biometric recognition.

In a first example embodiment, a method of generating a quality assessment value for a biometric sample is described, that may include, performing a convolution of the biometric sample with a set of wavelets to generate a plurality of wavelet features, selecting two or more of the plurality of the wavelet features based on a predetermined selection criteria, and processing the selected wavelet features with a set of predetermined boosted classifier rules to generate the quality assessment value for the biometric sample.

In a second example embodiment, a sample quality assessment device that generates a quality assessment value for a biometric sample is described that may include, a classification rule set data store that may include a set of predetermined boosted classifier rules, a wavelet feature extraction module that may perform a convolution of the biometric sample with a set of wavelets to generate a plurality of wavelet features, a classification engine module that may process two or more of the generated plurality of wavelet features with a boosted classifier based on the set of predetermined boosted classifier rules to generate the quality assessment value for the biometric sample.

In a third example embodiment, a method of training a biometric sample quality assessment device is described, that may include, receiving a plurality of gallery training samples of a common biometric sample type, receiving a plurality of probe training samples of the common biometric sample type, performing a convolution of each probe training sample with a set of wavelets to generate a plurality of wavelet features for each probe training sample, generating a match indicator for each probe training sample that indicates a degree of confidence on matching the probe training sample to one of the plurality of gallery training samples, processing the match indicator and wavelet features for each probe training sample with a boosted classifier to identify a subset of the plurality of wavelet features and a set of boosted classifier classification rules, storing a list that identifies the subset of the plurality of wavelet features to the biometric sample quality assessment device, and storing the set of boosted classifier classification rules to the biometric sample quality assessment device.

In a fourth example embodiment, a training device for training a biometric sample quality assessment device is described that may include, a gallery sample data store that may receive a plurality of gallery training samples of a common biometric sample type, a probe sample data store that may receive a plurality of probe training samples of the common biometric sample type, a wavelet feature extraction module that may perform a convolution of each probe training sample with a set of wavelets to generate a plurality of wavelet features for each probe training sample, a biometric sample recognition engine that may generate a match indicator for each probe training sample that indicates a degree of confidence on matching the probe training sample to one of the plurality of gallery training samples, and a classification engine module that may process the match indicator and wavelet features for each probe training sample with a boosted classifier to identify a subset of the plurality of wavelet features and a set of boosted classifier classification rules.

In a fifth example embodiment, a biometric fusion recognition system is described that may include, a gallery sample data store that may store a plurality of biometric gallery samples associated with an individual with an identity that has been verified, a quality assessment value data store that may contain a quality assessment value for a received biometric sample, and a biometric recognition engine that may match the received biometric sample with a gallery sample based, in part, on the quality assessment value for the received biometric sample, in which the quality assessment value is generated by a boosted classifier based on a set of predetermined boosted classifier rules and a plurality of wavelet features generated by performing a convolution of the received biometric sample with a plurality of wavelets.

BRIEF DESCRIPTION OF THE DRAWINGS

Example embodiments of a biometric sample training device, a biometric sample quality assessment device, a biometric fusion recognition device, an integrated biometric fusion recognition system and example processes in which each may be used will be described with reference to the following drawings, wherein like numerals designate like elements, and wherein:

FIG. 13 is an example of a facial image sample;

FIG. 14 is an example cropping mask template that may be used as part of a facial image sample preprocessing process;

FIG. 15 is an example of the facial image sample of FIG. 13 after the application of cropping and other example preprocessing techniques;

DETAILED DESCRIPTION OF EMBODIMENTS

Figure 1:
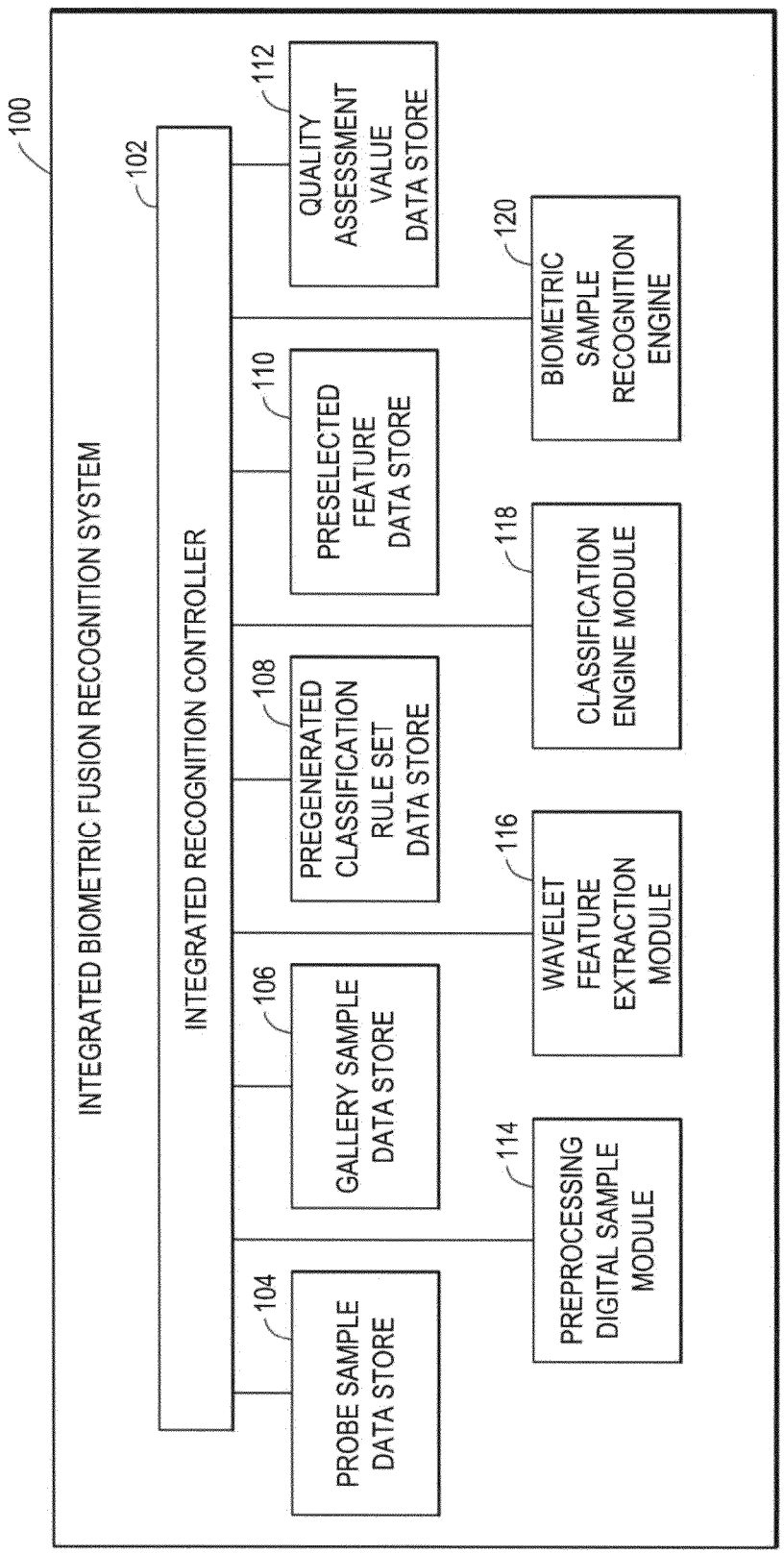
FIG. 1 is a block diagram of an integrated biometric fusion recognition system that supports biometric sample-based training, biometric sample quality assessment, and quality-based biometric sample fusion.

FIG. 1 is a block diagram of an integrated biometric fusion recognition system that supports biometric sample-based training, biometric sample quality assessment, and quality-based biometric sample fusion. As shown in FIG. 1, an integrated biometric fusion recognition system 100 may include an integrated recognition controller 102, a probe sample data store 104, a gallery sample data store 106, a pregenerated classification rule set data store 108, a preselected feature data store 110, a quality assessment value data store 112, a digital sample preprocessing module 114, a wavelet feature extraction module 116, a classification engine module 118 and a biometric sample recognition engine 120.

In operation, integrated recognition controller 102 may maintain a workflow state machine, and/or control parameters that allow each of the respective units described below to perform its assigned task. Further, integrated recognition controller 102 may receive status updates from the respective units so that integrated recognition controller 102 may coordinate the actions of the respective units in performing their respective biometric sample processing tasks. Example processes that may be executed by/coordinated by integrated recognition controller 102 to perform biometric sample-based training, biometric sample quality assessment, and quality-based biometric sample fusion are described below with respect to FIG. 6-8, respectively. The individual roles of the processing units shown in FIG. 1 with respect to those processes are described below.

Probe sample data store 104 may be used to store biometric samples, or probe samples, generated by biometric probes, e.g., cameras, scanners etc., of an individual whose identity is sought to be biometrically verified. Probe samples stored in probe sample data store 104 may be stored in association with a probe sample type identifier that identifies the type of biometric sample, e.g., facial image, fingerprint scan, dental scan, etc., contained within the probe sample.

Gallery sample data store 106 may be used to store biometric samples associated with an individual that has been verified. Gallery samples stored in gallery sample data store 106 may also be stored in association with a probe sample type identifier that identifies the type of biometric sample, e.g., facial image, fingerprint scan, dental scan, etc., contained within the gallery sample. During a biometric sample based recognition process, features within a received probe samples may be matched to features within gallery samples within gallery sample data store 106 of the same sample type to determine and/or to verify the identify of the subject associated with the probe sample.

Pregenerated classification rule set data store 108 may be used to store classification rule sets generated by classification engine module 118 during a biometric sample-based training process, as described below with respect to FIG. 6 and Table 1, below. A set of classification rules may be generated for each biometric sample type for which biometric sample quality assessment values may be generated and/or which may be included in a quality-based biometric sample fusion recognition process, as described in greater detail below.

Preselected feature data store 110 may be used to store list of selected wavelet features generated by classification engine module 118 during a biometric sample-based training process, as described below with respect to FIG. 6 and Table 1, below. A list of selected wavelet features may be generated for each biometric sample type for which biometric sample quality assessment values may be generated and/or which may be included in a quality-based biometric sample fusion recognition process, as described in greater detail below.

Quality assessment value data store 112 may be used to store probe sample quality assessment values generated by classification engine module 118 during a biometric sample quality assessment process, as described below with respect to FIG. 7 and Table 1, below. A store probe sample quality assessment value may be generated for each probe sample that may be included in a quality-based biometric sample fusion recognition process, as described below with respect to FIG. 8.

Digital sample preprocessing module 114 may perform digital preprocessing of incoming gallery samples and probe samples based on the type of biometric sample received. For example, with respect to facial image biometric samples, digital sample preprocessing module 114 may apply cropping, warping, histogram equalization and image normalization techniques as described below with respect to FIG. 13 through FIG. 15. Depending on the type of biometric sample received, e.g., fingerprints, dental records, retina scans, etc., the preprocessing techniques applied by digital sample preprocessing module 114 to the biometric sample may vary. The purpose of digital sample preprocessing is to reduce extraneous information within the biometric sample that may interfere with an objective, i.e., algorithmic, assessment of the quality of the biometric sample. On receipt of a new probe sample or gallery sample, integrated recognition controller 102 may invoke digital sample preprocessing module 114 to preprocess the received biometric sample. Once the preprocessing is completed, processes probe samples may be stored to probe sample data store 104 and gallery samples may be stored to gallery sample data store 106.

Wavelet feature extraction module 116 may generate wavelet features for a biometric probe sample, e.g., a facial image probe sample, by performing a convolution between the pixels of the biometric probe sample and a select set of wavelets, e.g., Gabor wavelets. For example, as described in greater detail below with respect to equation 1 and FIG. 9 through FIG. 12, wavelet feature extraction module 116 may generate wavelet features for a facial image probe sample based on a convolution of the facial image probe sample with a predetermined number, e.g., 40, of Gabor wavelets, each wavelet having 1 of multiple, e.g., 8, different orientations and 1 of multiple, e.g., 5, different scales. Depending on the type of biometric sample received, e.g., fingerprints, dental records, retina scans, etc., the number of wavelet features generated to support a biometric sample-based training process or a biometric sample quality assessment process may vary. Once a set of wavelet features are generated for a probe sample, the wavelet features may be stored in association with their respective probe image in probe sample data store 104. It is noted that in the case of a facial image probe sample in which each probe sample is a 64×64 pixel image, extracting wavelet features by convolution of the image with 40 wavelets results in each probe sample image being represented by 163,840 (=64×64×40) wavelet features.

Classification engine module 118 may operate in at least two operational modes, one mode that supports biometric sample-based training and another mode that supports biometric sample quality assessment. For example, in support of a biometric sample-based training process, as described in greater detail below with respect to FIG. 6, classification engine module 118 may receive a set of match indicators for each probe sample in a set of training probe samples generated by biometric sample recognition engine 120, as described below, and may receive a set of wavelet features, e.g., Gabor wavelet features, generated for each probe sample in the set of training probe samples. Classification engine module 118 may apply boosted classifier techniques, e.g., such as adaptive boosting (AdaBoost) techniques, such as the adaptive boosting approach described below with respect to Table 1, to select a subset of wavelet features, e.g., from the set of wavelet features generated for each probe sample by wavelet feature extraction module 116, and may generate a set of classification rules, i.e., a classification rule set, that may be used to assess the quality of a future probe sample based on values of the selected subset of wavelet features, e.g., Gabor wavelet features, generated for the specific probe sample. A list of the wavelet feature identifiers in the subset of wavelet features selected during the biometric sample-based training process for a biometric sample type, e.g., facial image, fingerprint image, dental image, etc., of a set of training probe samples may be stored in preselected feature data store 110 in association with an identifier of the probe sample type, i.e., a probe sample type identifier, of the set of training probe samples. The set of classification rules generated for use with the selected subset of wavelet features may be stored in pregenerated classification rule set data store 108 in association with the same probe sample type identifier associated with the list of selected wavelet features.

In support of a biometric sample quality assessment process, as described in greater detail below with respect to FIG. 7, classification engine module 118 may apply the adaptive boosting based pregenerated classification rule set, associated with the received probe sample's biometric sample type, to a set of wavelet features generated by wavelet feature extraction module 116 for the probe sample, based on the list of preselected wavelet features associated with the probe sample's biometric sample type, to generate a quality assessment value that may be stored in association with the probe sample in quality assessment value data store 112.

Biometric sample recognition engine 120 may also operate in at least two operational modes, one mode that supports biometric sample-based training and another mode that supports quality-based biometric sample fusion. For example, in support of a biometric sample-based training process, as described in greater detail below with respect to FIG. 6, biometric sample recognition engine 120 may attempt to match a set of biometric probe samples with corresponding gallery samples using biometric recognition techniques appropriate for the probe sample's biometric sample type. Biometric sample recognition engine 120 may generate a match indicator, for each probe sample, that indicates a degree of confidence that the matching process was successful. A generated match indicator may be stored in association with its associated probe sample in probe sample data store 104. In support of a quality-based biometric sample fusion process, as described in greater detail below with respect to FIG. 8, biometric sample recognition engine 120 may attempt to match a set of biometric probe samples, e.g., facial image probe samples, retina scan probe samples, and fingerprint probe samples, associated with a single identity with respective gallery samples, based on the use of biometric recognition techniques appropriate for each probe sample's biometric sample type, as well as the respective quality assessment value associated with each respective probe sample. For example, biometric sample recognition engine 120 may use the quality assessment values associated with each respective probe sample to weight and/or to adjust the respective biometric match results. Such an assessment may include a set of possible matches and confidence data related to each match.

As described above, integrated biometric fusion recognition system 100 may be configured to support three separate processes, namely, biometric sample-based training, biometric sample quality assessment, and quality-based biometric sample fusion. However, biometric sample-based training, biometric sample quality assessment, and quality-based biometric sample fusion processes may also be performed separately by separate devices. For example, a biometric sample-based training device is described below with respect to FIG. 2, a biometric sample quality assessment device is described below with respect to FIG. 3, and a biometric fusion recognition device is described below with respect to FIG. 4. Such separate devices may be capable of communicating with each other and sharing data across a network. Such specialization may facilitate information management and centralized control over a system that is deployed over a wide geographic area, while allowing the respective devices to be less complex. For example, a training device that supports a training process with respect to a single type of biometric sample, may include a less sophisticated biometric sample recognition engine than is required in a quality-based biometric sample fusion device that supports the fusion recognition based on multiple types of biometric samples as well as quality assessment values associated with each biometric sample. However, the results of a training process performed by such a less sophisticated training device may be provided to multiple biometric sample quality assessment devices, e.g., to individual biometric sample quality assessment devices integrated within probe sample sensors distributed throughout a facility that feed probe samples to a common biometric fusion recognition device, thereby assuring that the common biometric fusion recognition device receives consistent quality assessment values from the respective probe sample sensing devices.

Figure 2:
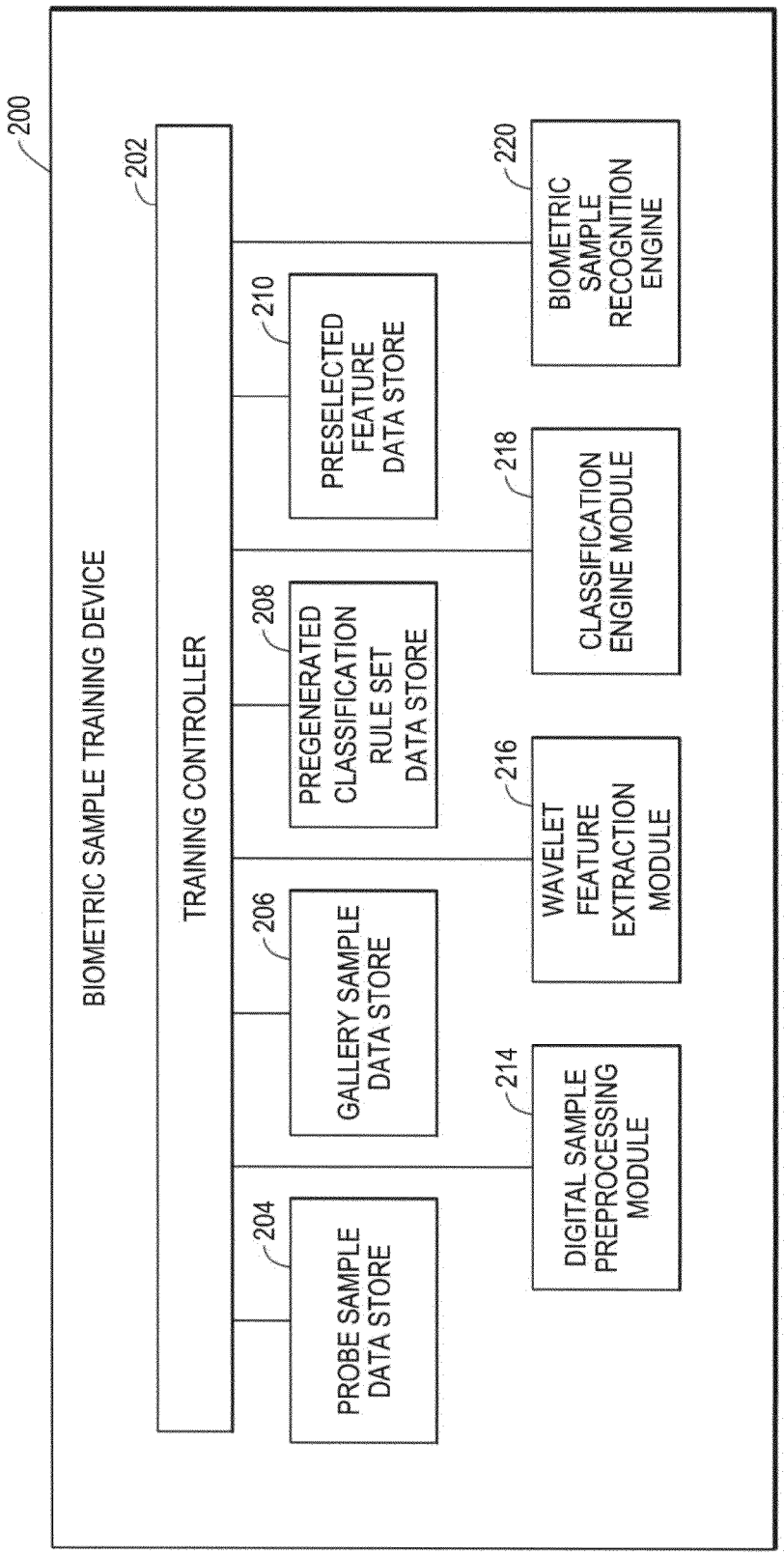
FIG. 2 is a block diagram of a biometric sample training device that supports biometric sample-based training.

FIG. 2 is a block diagram of a biometric sample-based training device that supports biometric sample-based training. As shown in FIG. 2, a biometric sample-based training device 200 may include a training controller 202, a probe sample data store 204, a gallery sample data store 206, a pregenerated classification rule set data store 208, a preselected feature data store 210, a digital sample preprocessing module 214, a wavelet feature extraction module 216, a classification engine module 218 and a biometric sample recognition engine 220.

In FIG. 2, modules within biometric sample-based training device 200 that perform functions similar to modules described above with respect to FIG. 1 are provided identical names, and are labeled with numeric labels in which the first digit matches the figure number, i.e., 2, and in which the last two digits match the numeric label assigned to the corresponding module in FIG. 1. Features associated with these corresponding modules will not again be described.

The modules in FIG. 2 may differ from those described above with respect to FIG. 1 in that their respective capabilities may be tailored to support only biometric sample-based training for the same number, or a reduced number, of biometric sample types supported by integrated biometric fusion recognition system 100. For example, classification engine module 218 may operate in only a single mode that supports biometric sample-based training, as described above with respect to FIG. 1 and below with respect to FIG. 6. Further, biometric sample recognition engine 220 may also operate in only a single mode that supports biometric sample-based training as described above with respect to FIG. 1 and below with respect to FIG. 6. A list of wavelet features and a classification rule set developed by biometric sample training device 200 for a probe sample type, e.g., a facial image sample, a fingerprint sample, etc., may be forwarded to another device, e.g., such as the biometric sample quality assessment device described below with respect to FIG. 3, to support quality assessment of probe samples of the same sample type. Further, since classification engine module 218 may not directly perform a biometric sample quality assessment process, as described below with respect to FIG. 7, no quality assessment value data store is required.

Figure 3:
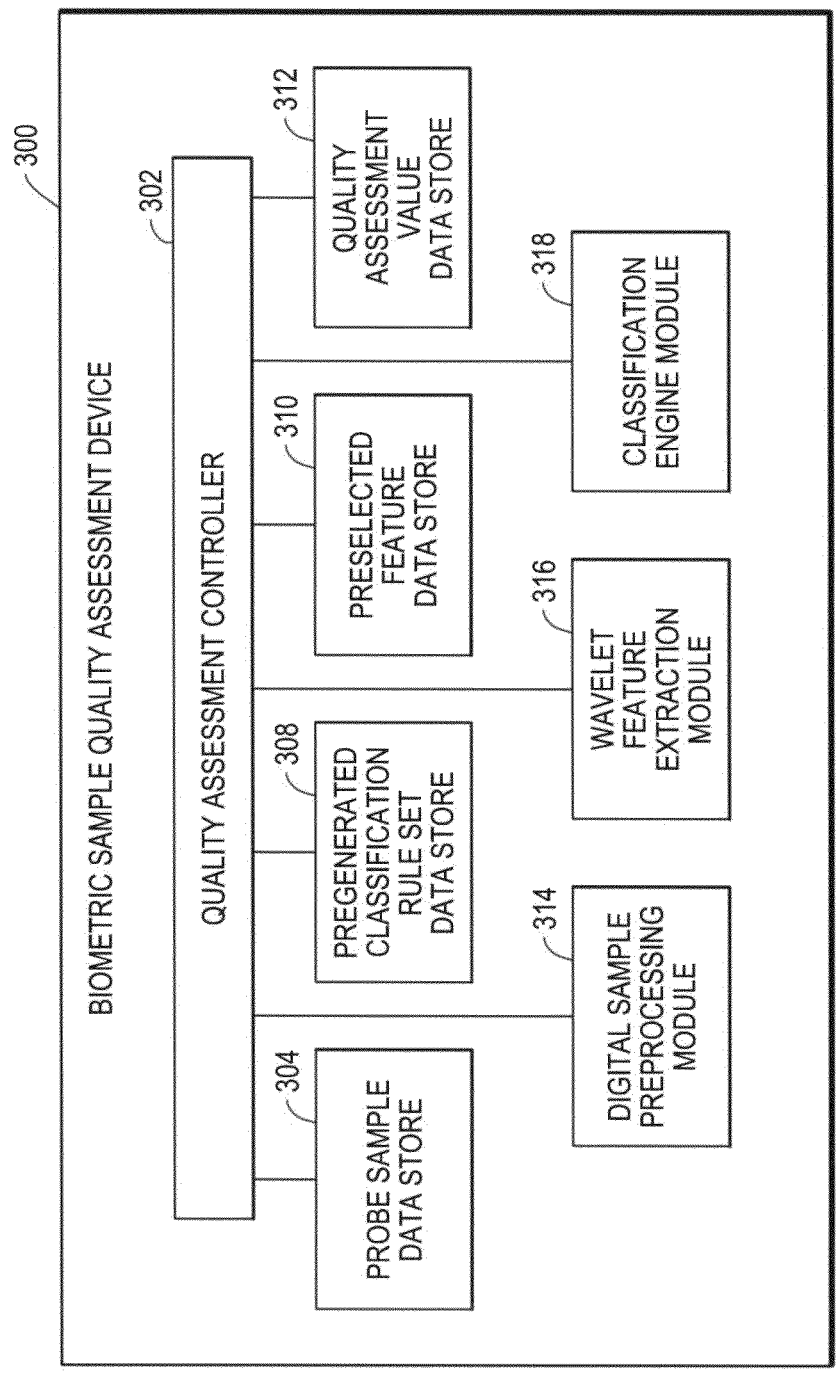
FIG. 3 is a block diagram of a biometric sample quality assessment device that supports biometric sample quality assessment.

FIG. 3 is a block diagram of a biometric sample quality assessment device that supports biometric sample quality assessment. As shown in FIG. 3, a biometric sample quality assessment device 300 may include a quality assessment controller 302, a probe sample data store 304, a pregenerated classification rule set data store 308, a preselected feature data store 310, a quality assessment value data store 312, a digital sample preprocessing module 314, a wavelet feature extraction module 316, and a classification engine module 318.

In FIG. 3, modules within biometric sample quality assessment device 300 that perform functions similar to modules described above with respect to FIG. 1 are provided identical names, and are labeled with numeric labels in which the first digit matches the figure number, i.e., 3, and the last two digits match the numeric label assigned to the corresponding module in FIG. 1. Features associated with these corresponding modules will not again be described.

The modules in FIG. 3 may differ from those described above with respect to FIG. 1 in that their respective capabilities may be tailored to support only biometric sample quality assessment for the same number, or a reduced number, of biometric sample types supported by integrated biometric fusion recognition system 100. For example, classification engine module 318 may operate in only a single mode that supports biometric sample quality assessment, as described above with respect to FIG. 1 and below with respect to FIG. 7. Further, since biometric sample quality assessment device 300 may not support biometric sample-based training or biometric fusion recognition, no gallery sample data store or biometric sample recognition engine is required.

Figure 4:
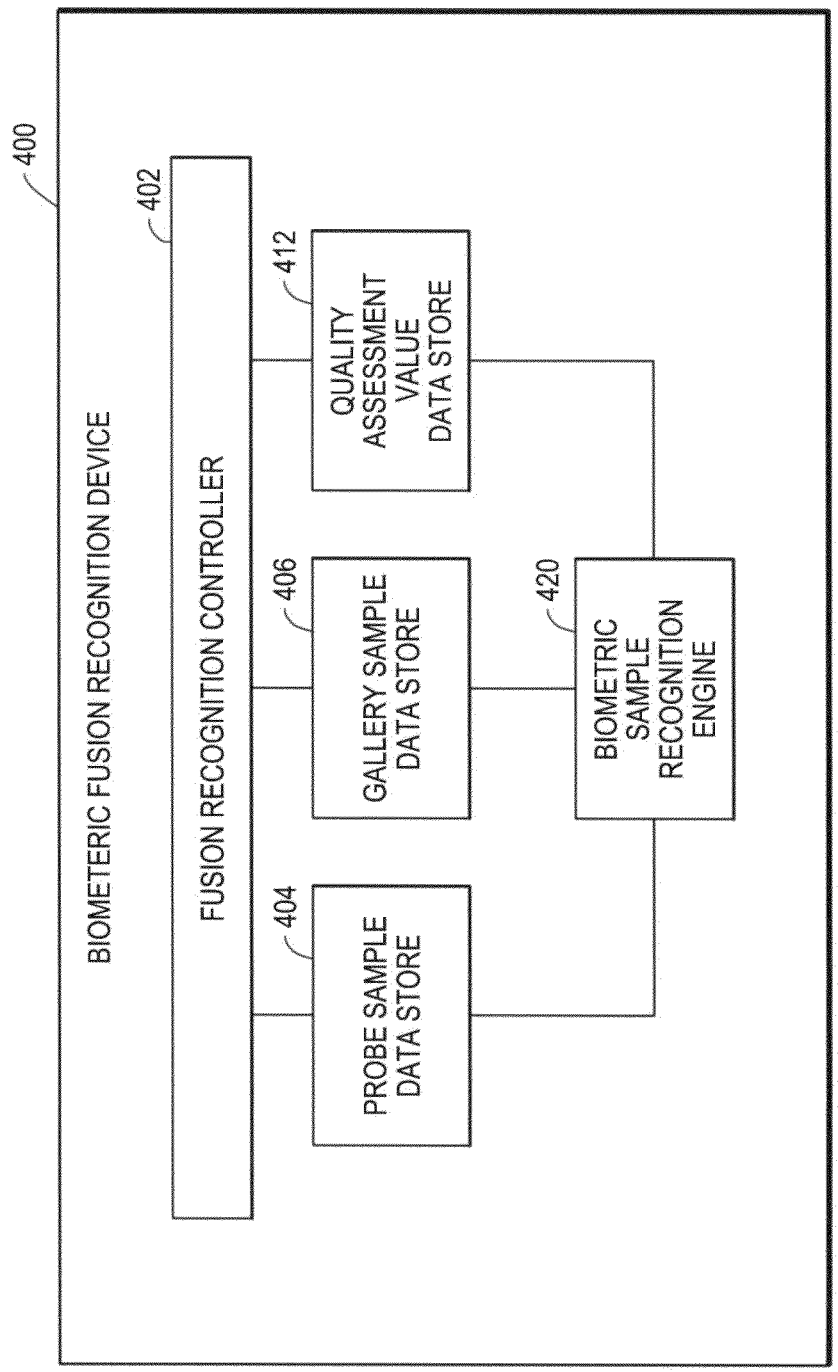
FIG. 4 is a block diagram of a biometric fusion recognition device that supports quality-based biometric sample fusion.

FIG. 4 is a block diagram of a biometric fusion recognition device that supports quality-based biometric sample fusion. As shown in FIG. 4, a biometric fusion recognition device 400 may include a fusion recognition controller 402, a probe sample data store 404, a gallery sample data store 406, a quality assessment value data store and a biometric sample recognition engine 420. Since biometric sample quality assessment device 300 may not support biometric sample-based training or biometric sample quality assessment, modules specific to those functions described above with respect to FIG. 2 and FIG. 3 are not required.

In FIG. 4, modules within biometric fusion recognition device 400 that perform functions similar to modules described above with respect to FIG. 1 are provided identical names, and are labeled with numeric labels in which the first digit matches the figure number, i.e., 4, and the last two digits match the numeric label assigned to the corresponding module in FIG. 1. Features associated with these corresponding modules will not again be described.

Figure 5:
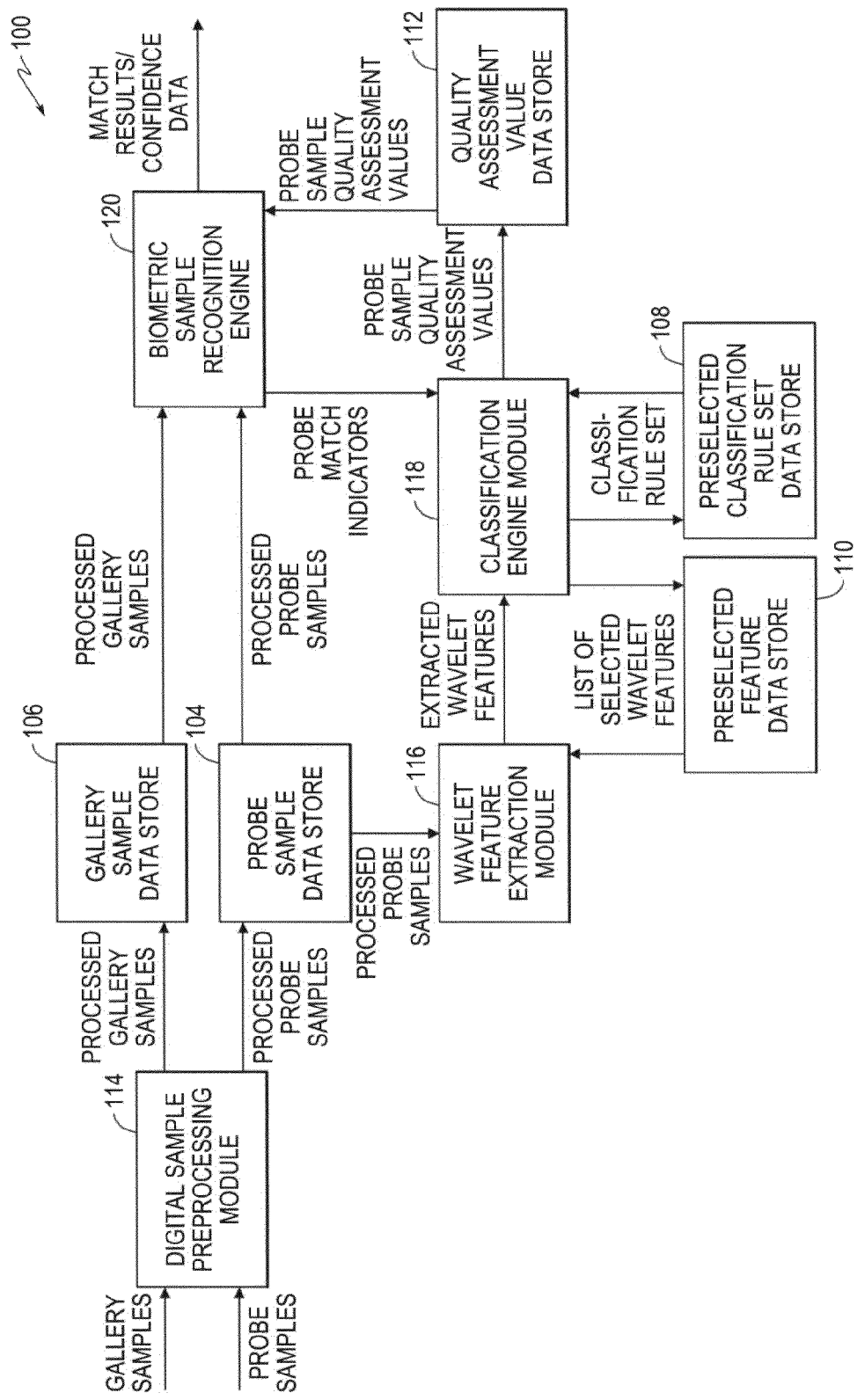
FIG. 5 is a schematic diagram of the integrated biometric fusion recognition system of FIG. 1.

FIG. 5 is a schematic diagram of the integrated biometric fusion recognition system 100 of FIG. 1. As shown in FIG. 5, the modules described above with respect to FIG. 1 are arranged so that the information flows between the respective modules can be more easily represented. The arrows between modules in FIG. 5 are labeled to indicate examples of data that may flow between the respective modules. The modules shown in FIG. 5 are identical to those described above with respect to FIG. 1 and perform the same functions described above with respect to FIG. 1 and, therefore, will not again be described. Although integrated recognition controller 102, as shown in FIG. 1, is not explicitly shown in FIG. 5, the presence and operation of integrated recognition controller 100 is assumed.

Figure 6:
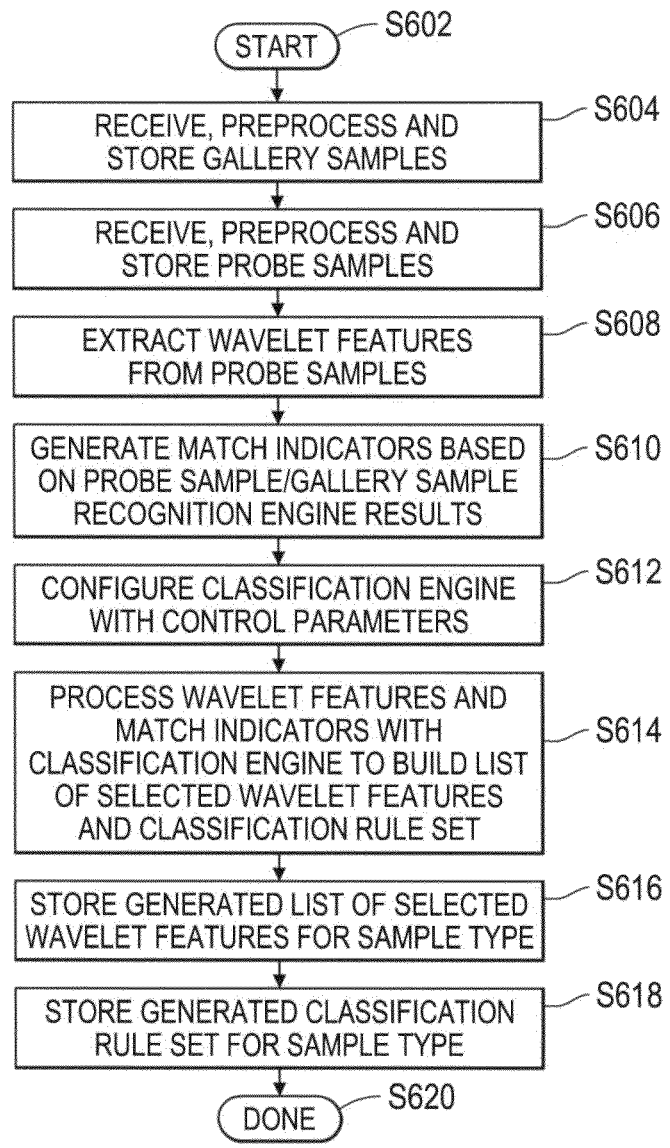
FIG. 6 is a flow-chart of an example process flow that may be performed by the integrated biometric fusion recognition system of FIG. 1 and FIG. 5 and/or the biometric sample training device of FIG. 2 to perform biometric sample-based training.

FIG. 6 is a flow-chart of an example process flow that may be performed by the integrated biometric fusion recognition system of FIG. 1 and FIG. 5 and/or the biometric sample training device of FIG. 2 to perform biometric sample-based training. In the process flow described below, it is assumed that the gallery sample data store 106 contains a gallery samples of the same sample type as the probe samples stored in probe sample data store 104. Further it is assumed that a matching sample is present in gallery sample data 106 store for each probe sample within a selected set of probe samples stored in probe sample data store 104. As shown in FIG. 6, operation of process 600 begins at step S602 and proceeds to step S604.

In step S604, each gallery sample in a set of training gallery samples may be received, submitted by integrated recognition controller 102 to digital sample preprocessing module 114 for preprocessing appropriate for the sample type, and stored in gallery sample data store 106, and operation of the process continues to step S606.

In step S606, each probe sample in a set of training probe samples may be received, submitted by integrated recognition controller 102 to digital sample preprocessing module 114 for preprocessing appropriate for the sample type, and stored in probe sample data store 104, and operation of the process continues to step S608.

In step S608, integrated recognition controller 102 may configure wavelet feature extraction module 116 with, for example, a Gabor wavelet transform complex kernel appropriate for the sample type, e.g., facial images, finger prints, etc., of samples in the set of training probe samples and may instruct wavelet feature extraction module 116 to extract a set of wavelet features, as described below with respect to equation 1 and FIG. 9 through FIG. 12, for each probe sample within the set of training samples stored in probe sample data store 104. The generated wavelet features may be stored within probe sample data store 104 in association with the respective probe sample from which they were generated, and operation of the process continues to step S610.

In step S610, integrated recognition controller 102 may instruct biometric sample recognition engine 120 to process each probe sample within the set of training probe samples stored in probe sample data store 104 to attempt to find a match for each training probe sample amongst the gallery samples stored in gallery sample data store 106. For each successful match, biometric sample recognition engine 120 may generate a match indicator for the probe sample that contains, for example, a value selected from a range of values that indicates, e.g., based on the position of the value within the range, a degree of confidence that the match is an accurate match. The generated match indicators may be stored to probe sample data store 104 in association with the respective probe sample for which they were generated, and operation of the process continues to step S612.

In step S612, integrated recognition controller 102 may configure classification engine module 118 with control parameters and an adaptive boosting algorithm appropriate for the sample type, e.g., facial images, finger prints, etc., for which training is being performed, and operation of the process continues to step S614.

In step S614, classification engine module 118 may iteratively process the match indicators generated in step S610 and the probe sample wavelet features generated in step S608 using a boosted classifier, e.g., AdaBoost, based approach, as described below with respect to Table 1. As a result of the iterative process, classification engine module 118 may identify a subset of the probe sample wavelet features generated in step S608 and may generate a set of classification rules, such that when the classification rules are applied to values of the selected wavelet features for each probe sample in the set of training probe samples, the value of the match indicator generated in step S610 for each of the respective probe samples is duplicated. Once such a subset of the probe sample wavelet features is identified and such a set of classification rules is generated, operation of the process continues to step S616.

In step S616, classification engine module 118 may store identifiers for each of the wavelet features in the selected subset of wavelet features in preselected feature data store 110, in association with the sample type for which the training was performed, operation of the process continues to step S618.

In step S618, classification engine module 118 may store the set of generated classification rules in pregenerated classification rule set data store 108, and operation of the process terminates at step S620.

Figure 7:
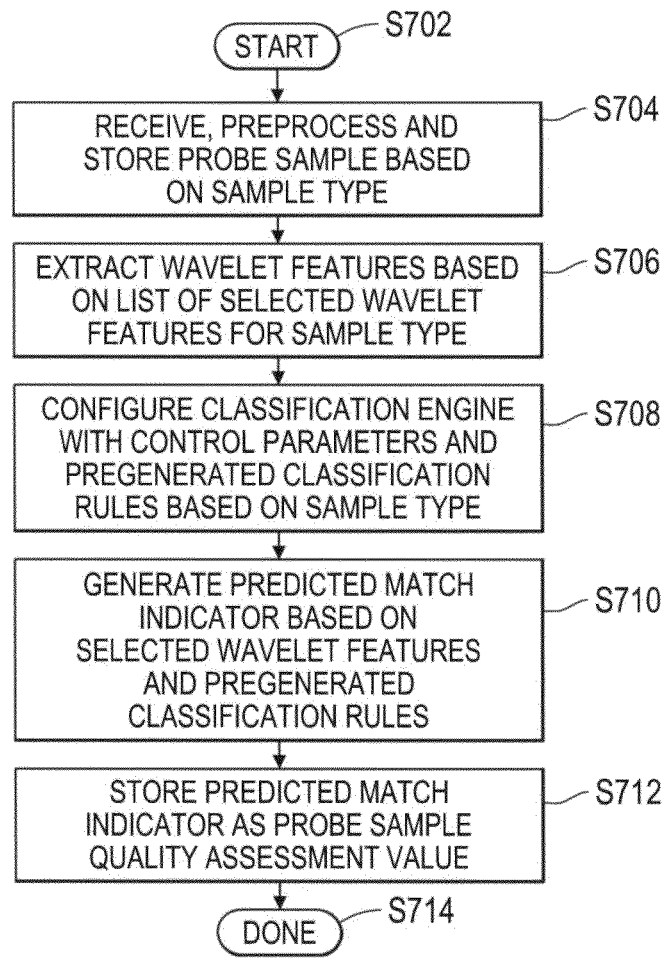
FIG. 7 is a flow-chart of an example process flow that may be performed by the integrated biometric fusion recognition system of FIG. 1 and FIG. 5 and/or the biometric sample quality assessment device of FIG. 3 to perform biometric sample quality assessment.

FIG. 7 is a flow-chart of an example process flow that may be performed by the integrated biometric fusion recognition system of FIGS. 1 and 5, and/or the biometric sample quality assessment device of FIG. 3 to perform biometric sample quality assessment. In the process flow described below, it is assumed that the preselected feature data store 110 has been populated with identifiers for each of the wavelet features in the subset of wavelet features, generation of which is described with respect to FIG. 6 at step S614, selected for the probe sample type of the probe sample for which a probe sample quality assessment value is to be generated. Further, it is assumed that the pregenerated classification rule set data store 108 has been populated with a classification rule set, generation of which is described with respect to FIG. 6 at step S614, generated for the probe sample type of the probe sample for which a probe sample quality assessment value is to be generated. As shown in FIG. 7, operation of process 700 begins at step S702 and proceeds to step S704.

In step S704, a probe sample may be received from a probe sensor, submitted by integrated recognition controller 102 to digital sample preprocessing module 114 for preprocessing appropriate for the sample type, and stored in probe sample data store 104, and operation of the process continues to step S706.

In step S706, integrated recognition controller 102 may configure wavelet feature extraction module 116 with, for example, a Gabor wavelet transform complex kernel appropriate for the sample type, e.g., facial images, finger prints, etc., and may instruct wavelet feature extraction module 116 to extract the selected set of wavelet features associated with the sample type of the received probe image in preselected feature data store 110, and operation of the process continues to step S708.

In step S708, integrated recognition controller 102 may configure classification engine module 118 with control parameters, an adaptive boosting algorithm appropriate for the sample type, e.g., facial images, finger prints, etc., for which training is being performed, and a set of classification rules associated with the sample type of the received probe image in pregenerated classification rule set data store 108, and operation of the process continues to step S710.

In step S710, classification engine module 118 may generate a predicted match indicator based on the preselected wavelet features and the pregenerated classification rule set, and operation of the process continues to step S712.

In step S712, classification engine module 118 may store the predicted match indicator in quality assessment value data store 112 in association with the probe sample as the probe sample quality assessment value for the received probe sample, and operation of the process terminates at step S714.

Figure 8:
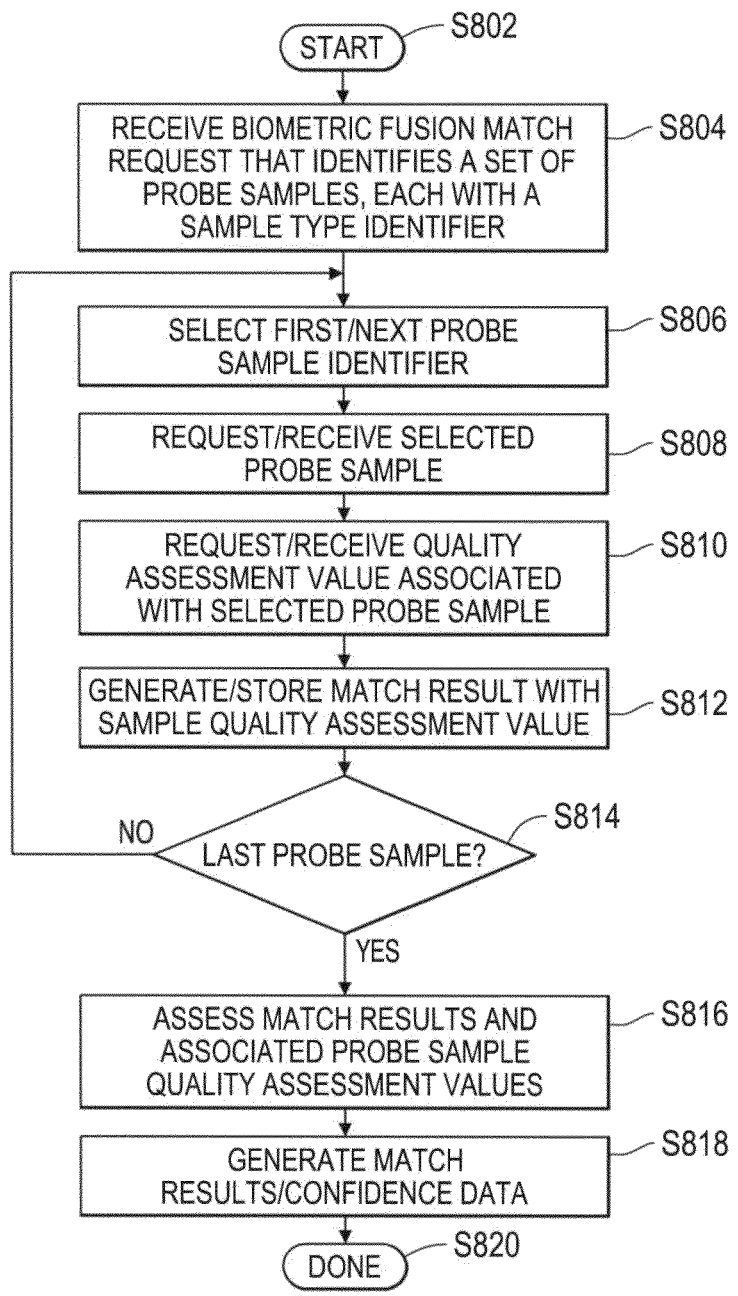
FIG. 8 is a flow-chart of an example process flow that may be performed by the integrated biometric fusion recognition system of FIG. 1 and FIG. 5 and/or the biometric fusion recognition device of FIG. 4 to perform quality-based biometric sample fusion.

FIG. 8 is a flow-chart of an example process flow that may be performed by the integrated biometric fusion recognition system of FIGS. 1 and 5 and/or the biometric fusion recognition device of FIG. 4 to perform quality-based biometric sample fusion. In the process flow described below, it is assumed that biometric sample recognition engine 120 has received, e.g., via integrated recognition controller 102, a biometric fusion match request that identifies a set of probe samples, and that each of the probe samples identified in the match request is associated with a sample type that may be the same as, or different from, the sample type of other probe samples identified in the biometric fusion match request. Further, it is assumed that prior to sending the biometric fusion match request to biometric sample recognition engine 120, a quality assessment value has been generated for each probe sample associated with the biometric fusion match request and that the quality assessment value for the probe sample is available to biometric sample recognition engine 120. For example, in one embodiment, the generation of a quality assessment value for each probe sample associated with the biometric fusion match request may be initiated by integrated recognition controller 102 prior to sending the biometric fusion match request to biometric sample recognition engine 120. In another embodiment, a quality assessment may be generated by the probe sensor at the time the probe sample was generated and may be passed as an integral component of the generated probe sample. As shown in FIG. 8, operation of process 800 begins at step S802 and proceeds to step S804.

In step S804, biometric sample recognition engine 120 may receive a biometric fusion match request that identifies a set of probe samples and identifies a sample type identifier for each probe sample, and operation of the process continues to step S806.

In step S806, biometric sample recognition engine 120 may select a first probe sample identifier from the received biometric fusion match request, and operation of the process continues to step S808.

In step S808, biometric sample recognition engine 120 may request a probe sample from probe sample data store 104 associated with the selected probe sample identifier. In response, biometric sample recognition engine 120 may receive the corresponding probe sample from probe sample data store 104, and operation of the process continues to step S810.

In step S810, biometric sample recognition engine 120 may request a probe quality assessment value associated with the selected probe sample identifier, e.g., from quality assessment value data store 112. In response, biometric sample recognition engine 120 may receive the corresponding quality assessment value, and operation of the process continues to step S812.

In step S812, biometric sample recognition engine 120 may execute a matching algorithm appropriate for the sample type associated with the selected probe sample, and may store the match result in association with the corresponding probe sample quality assessment value, and operation of the process continues to step S814.

If, in step S814, biometric sample recognition engine 120 determines that the last probe sample associated with the biometric fusion match request has been processed, operation of the process continues to step S816; otherwise, operation of the process continues to step S806.

In step S816, biometric sample recognition engine 120 may collectively assess the match results and associated probe sample quality assessment values. For example, biometric sample recognition engine 120 may use the probe sample quality assessment values to either increase or decrease a confidence factor associated with a match result, and operation of the process continues to step S818.

In step S818, biometric sample recognition engine 120 may generate biometric fusion match results which may include adjusted matches, adjusted rankings and/or adjusted confidence values based on an assessment of the probe sample quality assessment values associated with the probe samples used to generate the match results, and operation of the process terminates at step S820.

In the descriptions above, numerous references are made to the use of wavelets, an example of which that may be used in the process described above are Gabor wavelets. Gabor wavelets are a series of complex kernels that are complex sinusoids modulated by Gaussian windows. The complex kernels with different scales and orientations may be defined as:

$$\psi_{\mu,\nu}(z) = \frac{\|k_{\mu,\nu}\|^2}{\sigma^2} e^{-\frac{\|k_{\mu,\nu}\|^2 \|z\|^2}{2\sigma^2}} \left( e^{i\vec{k}_{\mu,\nu} z} - e^{-\frac{\sigma^2}{2}} \right) \quad \text{Equation 1}$$

where z=(x, y) is the point with the horizontal and vertical coordinates x and y, µ and ν define the orientation and the scale of the Gabor kernels, and σ determines the ratio of the standard deviation of the Gaussian envelope to the wavelength.

The wave vector $k_{\mu,\nu}$ is indexed by both scale index, µ, and orientation index, ν, and is defined as $k_{\mu,\nu}=k_\nu e^{i\phi_\mu}$, with $$k_\nu = \frac{k_{max}}{f^\nu} \quad \text{and} \quad \phi_\mu = \frac{\pi}{n}\mu,$$

where n is the number of different orientations and $k_{max}$ is the maximum frequency, and $f^\nu$ is the spatial frequency between kernels in the frequency domain. The wave vector $k_{\mu,\nu}$ is a complex scalar representing the direction and frequency of Gabor wavelets. In the equation above, $k_{\mu,\nu}$ is vectorized as $\vec{k}_{\mu,\nu}=[\text{Real}(k_{\mu,\nu}) \text{ Imag}(k_{\mu,\nu})]$. For face recognition, 40 Gabor wavelets with five scales and eight orientations are commonly used. The five scales are $v \in \{0, 1, 2, 3, 4\}$ and the eight orientations are $\mu \in \{0, 1, 2, 3, 4, 5, 6, 7\}$. Other parameters for face recognition are typically set as follows: $\sigma = 2\pi$, $k_{max} = \pi/2$, and $f = \sqrt{2}$.

Gabor wavelets have been successfully used for extracting local features for pattern recognition tasks, such as texture segmentation, imaging process, and fingerprint recognition. Several characteristics of Gabor wavelets may contribute to their success. Among them are: 1) the shapes of Gabor wavelets are similar to the receptive fields of simple cells in the primary visual cortex; 2) Gabor wavelets are optimal for measuring local and spatial frequencies; and 3) Gabor wavelet representation of face images is robust to variations due to illumination and facial expression changes.

Figure 9:
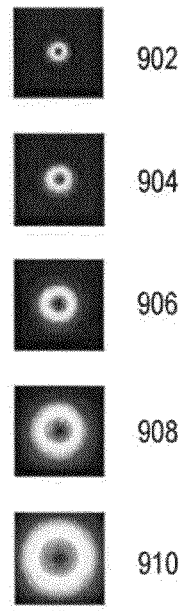
FIG. 9 presents visual representations of the magnitude components of 5 Gabor wavelets, each wavelet having 1 of 5 different scales.
Figure 10:
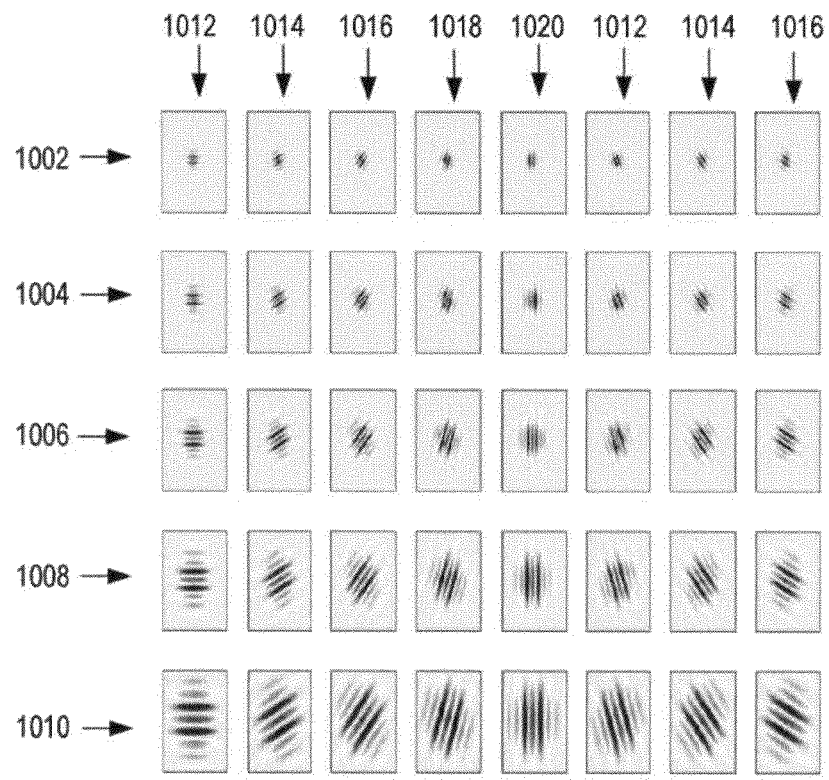
FIG. 10 presents visual representations of the real components of 40 Gabor wavelets, each wavelet having 1 of 8 different orientations and 1 of 5 different scales.

FIG. 9 presents visual representations of the magnitude components of 5 Gabor wavelets (labeled 902 through 910 in FIG. 9), each wavelet having 1 of 5 different scales, while FIG. 10 presents visual representations of the real components of 40 Gabor wavelets, each wavelet having 1 of 8 different orientations (labeled 1012 through 1016 in FIG. 10) and 1 of 5 different scales (labeled 1002 through 1010 in FIG. 10). As shown in FIG. 9 and FIG. 10, Gabor wavelets exhibit desirable characteristics of spatial frequency, spatial locality, and orientation selectivity. To represent a probe sample, e.g., a facial image, with Gabor wavelets, the probe sample may be convolved with each of 40 Gabor wavelets, each wavelet having 1 of 8 different orientations and 1 of 5 different scales.

Figure 11:
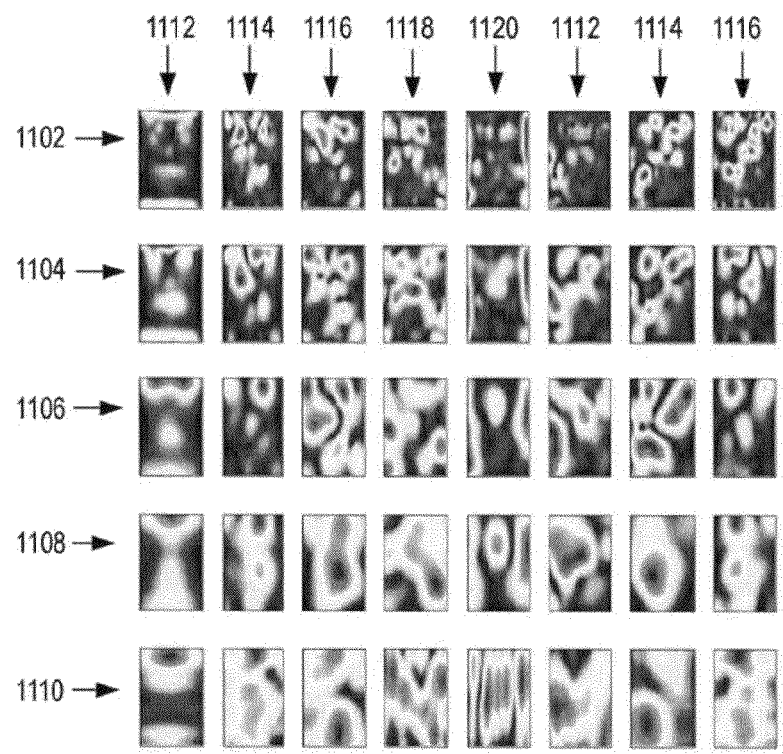
FIG. 11 presents visual representations of the magnitude component results of a convolution of a sample facial image with each of 40 Gabor wavelets, each wavelet having 1 of 8 different orientations and 1 of 5 different scales.
Figure 12:
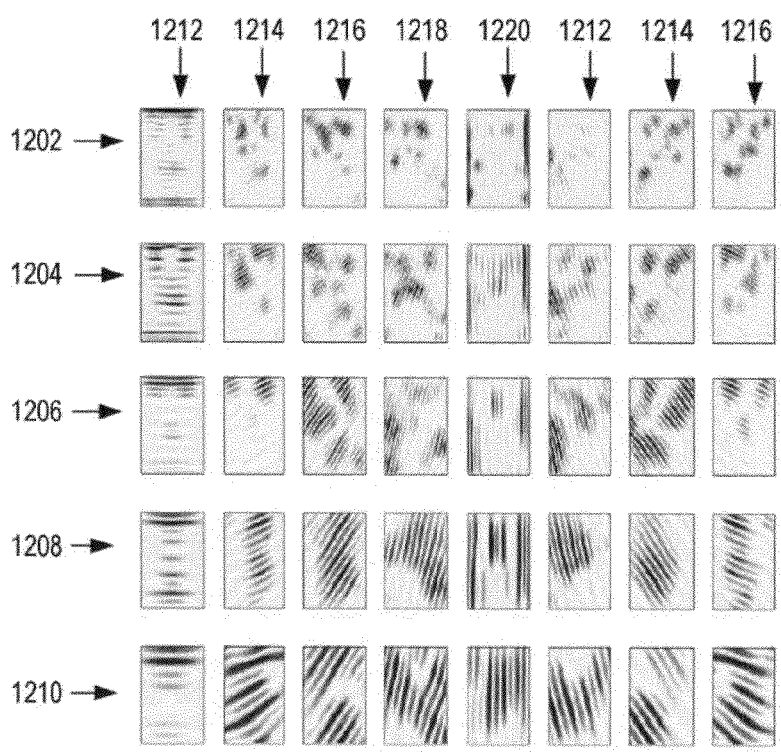
FIG. 12 presents visual representations of the real component results of a convolution of a sample facial image with each of 40 Gabor wavelets, each wavelet having 1 of 8 different orientations and 1 of 5 different scales.

FIG. 11 presents visual representations of the magnitude component results of a convolution of a sample facial image with each of 40 Gabor wavelets, each wavelet having 1 of 8 different orientations (labeled 1112 through 1116 in FIG. 11) and 1 of 5 different scales (labeled 1102 through 1110 in FIG. 11). FIG. 12 presents visual representations of the real component results of a convolution of a sample facial image with each of 40 Gabor wavelets, each wavelet having 1 of 8 different orientations (labeled 1212 through 1216 in FIG. 12) and 1 of 5 different scales (labeled 1202 through 1210 in FIG. 12). The magnitude representation of the convolution, shown in FIG. 11, has been used in related art as wavelet features in facial image recognition. Therefore, in described embodiments in which the probe sample is a facial image, the convolution results such as those shown in FIG. 11 may be generated by wavelet feature extraction module 116 in support of the described biometric sample-based training and described biometric sample quality assessment processes.

As shown in FIG. 11, because the convolution is performed for each pixel of the image and for each of the 40 Gabor wavelets, the convolution of each image results in a feature vector that has a dimension of 40 times of the original image size. However, as described in greater detail below, a boosted classifier, e.g., that uses adaptive boosting, or AdaBoost, techniques may be used to reduce the number of wavelet features required to support optimal classification performance.

AdaBoost is a classification technique that can be used to build a strong classifier by sequentially incorporating weak classifiers from a large set of weak classifiers. Since its first introduction in 1995, AdaBoost has been widely used for solving various classification problems. The popularity of AdaBoost may be due to the following advantages over other classifiers: 1) it is computationally efficient; 2) it is effective; 3) it is simple and easy to implement; 4) it requires no prior knowledge about the weak learner; and 5) it has no tunable parameters (except for the number of weak learners). An example AdaBoost classifier algorithm embodiment is presented in Table 1.

TABLE 1

Pseudo-code of AdaBoost algorithm

Input:
 the n training samples $\{(x_1, y_1), (x_2, y_2), \ldots (x_n, y_n)\}$ where $x_i \in X$ and $y_i \in Y = \{0, 1\}$
 Weak classifier
 Integer T for # of iterations
Initialization:
 Initialize weights $w_0^{(i)} = \begin{cases} 1/(2m) & \text{for } y_i = 0 \\ 1/(2l) & \text{for } y_i = 1 \end{cases}$ where m and l are the numbers of negative and positive samples, respectively.
For t = 1, 2, ... T
1. Normalize the weights, $w_t^{(i)} = \dfrac{w_t^{(i)}}{\sum_{j=1}^{n} w_t^{(j)}}$ 2. Select the best classifier with respect to the weighted error
$$\varepsilon_t = \min_{f,p,\theta} \sum_i w_i |h(x_i, f, p, \theta) - y_i|$$

3. Define $h_t(x) = h(x, f_t, p_t, \theta_t)$ where $f_t, p_t$, and $\theta_t$ are the minimizers for $\varepsilon_t$
4. Set $\beta_t = \varepsilon_t/(1 - \varepsilon_t)$
5. Update the weights: $w_{t+1}^{(i)} = w_t^{(i)} \beta_t^{1-e_i}$ where $e_i = 0$ if $x_i$ is classified correctly and $e_i = 1$ otherwise.

Output: the final strong classifier is
$$h(x) = \begin{cases} 1 & \sum_{t=1}^{T} \alpha_t h_t(x) \geq \dfrac{1}{2} \sum_{t=1}^{T} \alpha_t \\ 0 & \text{Otherwise} \end{cases}, \text{ where } \alpha_t = \log\dfrac{1}{\beta_t}$$

The version of AdaBoost shown in Table 1 is slightly different from the original AdaBoost introduced in 1995. The main difference is shown at step 2 in Table 1 in which each feature is treated as a potential weak classifier in each learning iteration. To select the best classifier/feature in each iteration, the optimal threshold may be determined first such that the number of examples that are misclassified is minimal. The classifier/feature that gives the minimal classification error may then selected. Hence a weak classifier here is represented as $h(x, f, p, \theta)$, where $f, p, \theta$ are the feature, the threshold, and the polarity indicating the direction of the inequality.

The version of AdaBoost shown in Table 1 may be effectively used by classification engine for feature selection purposes, as described above with respect to FIG. 1, FIG. 2, FIG. 3, FIG. 5, and FIG. 6. However, in example embodiments, improved performance may be achieved by using an AdaBoost algorithm such as that shown in Table 1 to determine a reduced number of wavelet features by the classification engine module during a biometric sample-based training process, as described with respect to FIG. 6, and using a different classifier to generate quality assessment values, as described above with respect to FIG. 7.

In the descriptions above with respect to the integrated biometric fusion recognition system of FIG. 1 and FIG. 5, the biometric sample training device of FIG. 2 and/or the biometric sample training process described with respect to FIG. 6, biometric sample recognition engine 120 is described as supporting the generation of match indicators based on a search for a match for a received probe sample within the gallery samples stored in gallery sample data store 106.

The match indicators may be estimated based on match scores between each of the probe samples and the gallery samples. For example, assuming that the probe sample is a facial image, biometric sample recognition engine 120 may be implemented using a facial recognition engine marketed as Identix FaceIt. Identix FaceIt first finds eye coordinates in the probe sample, applies a face template and generates a match score for each probe sample/gallery sample match obtained.

For example, assuming that a probe sample is matched to a set of gallery samples with 226 gallery samples, a 226-element vector of raw match scores for each probe face may be obtained. Given that the true matching gallery face is known a priori, a normalized match score (NMS) can be calculated for each facial image probe sample. The normalized match score measures how easy a probe sample can be correctly identified from the gallery samples. Thus, the normalized match score is an indication of the quality of the facial image probe sample. The higher the normalized match score is, the higher the quality of the facial image probe sample. The normalized match score can be further binned into a set of different quality levels, for example, 5 different quality levels (poor, fair, good, very good, and excellent) may be used. However, in the example embodiments described above, it may be assumed that the normalized match score is binned into two quality levels, namely poor and good, using a normalized match score of 10 as the threshold. As a result, each match indicator within the set of match indicators generated for a set of probe samples may be represented as either 0 or 1, as represented in equation 2, below.

$$Quality = \begin{cases} poor\ (0) & for\ NMS < X \\ good\ (1) & for\ NMS \geq X \end{cases} \quad \text{Equation 2}$$

Where X is an integer number, e.g., 10.

In the descriptions above with respect to the integrated biometric fusion recognition system of FIG. 1 and FIG. 5, the biometric sample training device of FIG. 2, the biometric sample training process described with respect to FIG. 6 and/or the biometric sample quality assessment process described with respect to FIG. 7, digital sample preprocessing module 314 is described as supporting a preprocessing process that may be used to digitally preprocess incoming gallery samples and probe samples based on the type of biometric sample received. Depending on the type of biometric sample received, e.g., fingerprints, dental records, retina scans, etc., the preprocessing techniques applied by digital sample preprocessing module 114 to the sample may vary. The purpose of digital sample preprocessing is to reduce extraneous biometric information that may interfere with an objective, i.e., algorithmic, assessment of the quality of the biometric sample. For example, with respect to facial image biometric samples, digital sample preprocessing module 114 may apply cropping, warping, histogram equalization and image normalization techniques.

FIG. 13 through FIG. 15 provide an example of preprocessing techniques that may be applied to a facial image samples. FIG. 13 is an example of a facial image sample; FIG. 14 is an example copping mask template that may be used as part of a facial image sample preprocessing process; and FIG. 15 is an example of the facial image sample of FIG. 13 after the application of cropping and other example preprocessing techniques.

A raw facial image 1300, as shown in FIG. 13, may first be cropped using a rectangular copping mask template 1400, such as that shown in FIG. 14. The size and location of the template with respect to the raw facial image may be determined by matching eye positions 1402 in the template with the eyes of the subject in the facial image. A distance, represented by a "D" in FIG. 14, between the facial image eye positions may then be determined that may be used to calculate the remaining dimensions of the mask template. For example, a side margin between each eye position and a corresponding vertical side of the mask template, represented by a "A" in FIG. 14 may be calculated as, for example, 0.64*D; a top margin between the eye positions and a horizontal top of the mask template, represented by a "B" in FIG. 14 may be calculated as, for example, 0.43*D; and a bottom margin between the eye positions and a the horizontal bottom of the mask template, represented by a "C" in FIG. 14 may be calculated as, for example, 1.85*D, may all be calculated based on the distance, "D," measures between the eyes of the subject in the raw image. The ratios used to determine the respective mask template dimensions may be selected so that once the raw image is cropped by the mask template the remaining cropped image includes facial features, but eliminates such features as background and hairstyle.

In one example embodiment the cropped facial sample image may then be warped to a common size, e.g., 64-by-64 pixels, a histogram equalization may be applied to the cropped, warped facial image to minimize contrast differences, and the image may be normalized to zero mean and one standard deviation to compensate for variations in contract and brightness in the raw images. The effects of such preprocessing are clearly visible based on a comparison of the unprocessed facial image shown at FIG. 13 and the cropped and processed image 1500 shown at FIG. 15. Such preprocessing facilitates the biometric sample recognition process by reducing extraneous information while retaining detail that may be used to compare and match samples. Although the example provided above relates to facial image samples, preprocessing techniques may be applied to other types of probe samples based on the probe sample type. For example, a set of preprocessing techniques may be applied to other probe sample types, e.g., finger prints, retina scans, etc., that also have the effect of reducing extraneous information while retaining detail that may be used to compare and match samples.

Figure 19:
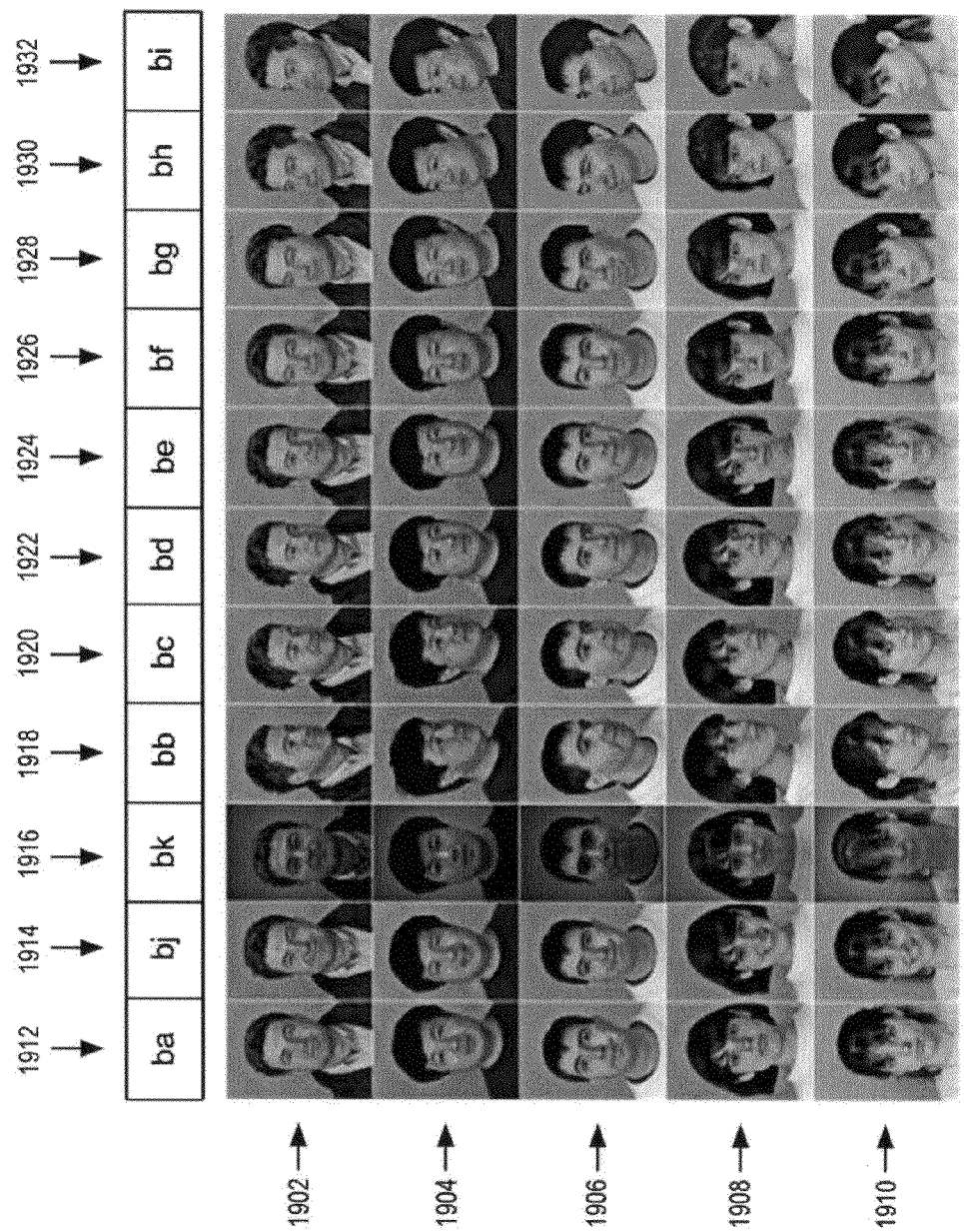
FIG. 19 is a set of example images from the B-series dataset of the FERET database in which each subject has 11 faces with different facial expression, different lighting, and different pose angles.

The biometric fusion recognition approach described above supports biometric sample-based training, biometric sample quality assessment, and quality-based biometric sample fusion with wavelets and boosted classifier processing techniques. To validate the described approach, a test of the approach was conducted using grayscale facial image biometric samples selected from the standard Facial Recognition Technology (FERET) database. The grayscale version of the FERET database consists of a total of over 14000 facial images. These facial images are categorized based on pose, illumination, and facial expression. The database has about 3880 frontal or near-frontal faces and has 200 faces for each of the eight pose angles ranging from −60 to +60. The database also consists of a standard gallery set with 1196 near-frontal faces, a standard probe set with 1195 faces, and a standard training set with 1002 faces, which have been popularly used for face recognition evaluation. FIG. 19 presents a set of example images from the B-series dataset of the FERET database in which each subject has 11 faces (labeled 1912 through 1932 in FIG. 19) with different facial expression, different lighting, and different pose angles (labeled 1902 through 1910 in FIG. 19).

To cover as many images as possible from various defect categories and to ensure a good distribution of quality levels, probe samples were selected as follows. Fifty faces were selected from each of the eight pose angles from the FERET database are sampled first. Fifty faces were selected from each of the three frontal-face categories, namely, regular facial expression, alternative facial expression, and different illumination are also used. These selections resulted in a total of 550 facial images. To represent facial images with lower resolution, the 550 faces were down-sampled to the size of 50% and 25% of the original size, respectively, which provided another 1100 faces. In all, there were a total of 1650 facial images in the set of probe samples stored to the probe sample data store. Further, the gallery sample data store was populated with a set of 226 frontal facial images from the standard FERET gallery set representing each of the 226 unique subjects i.e., each individual person, included in the probe sample data store.

The test was divided into two phases: a training phase; and a testing phase. In support of the training phase the 1650 probe faces included in the probe sample data store were randomly split into 2 disjoint subsets. 1000 probe sample images were used for training and the remaining 650 faces were used for testing.

During the biometric sample-based training, the wavelet feature extraction module 116 was configured to perform a convolution of each image in the probe sample set with 40 Gabor wavelets, as described above with respect to FIG. 1, and the classification engine module 118 was provided an AdaBoost algorithm configured to select the top select 500 wavelet features.

As described above, each of the weak classifiers processed by the AdaBoost corresponds to a Gabor feature. Thus the 500 weak classifiers selected by classification engine module 118 actually represent the top 500 wavelet features.

Figure 16:
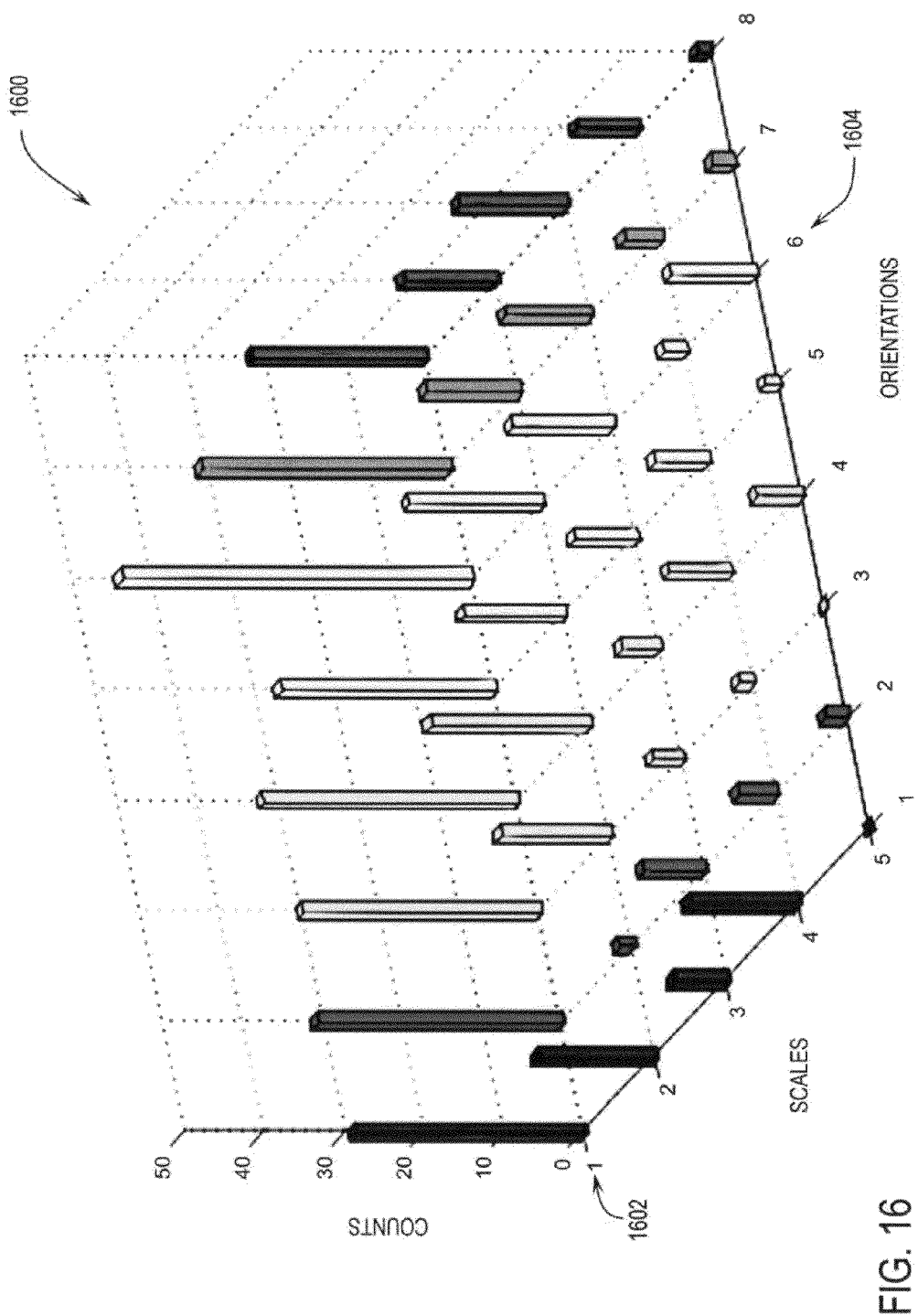
FIG. 16 is a 3-dimensional plot of an example distribution, over the 5 scales and 8 orientations of Gabor wavelets, of the top 500 features selected during a facial image recognition training process.

FIG. 16 is a 3-dimensional plot 1600 of an example distribution, over the 5 scales and 8 orientations of Gabor wavelets, of the top 500 features selected during a facial image recognition training process. Based on the results shown in FIG. 16, one can see that about a half of the 500 features are from scale 1 (v=0) (labeled 1602 in FIG. 16) and that higher scale wavelets generally tend to contribute less to the feature pool. In terms of orientation, there seems no single dominant orientation that contributes the most to the feature pool. Orientation #6

$$\left(\phi_\mu = \frac{5\pi}{8}\right)$$

(labeled 1604 in FIG. 16) seems to contribute slightly more than others.

Figure 18:
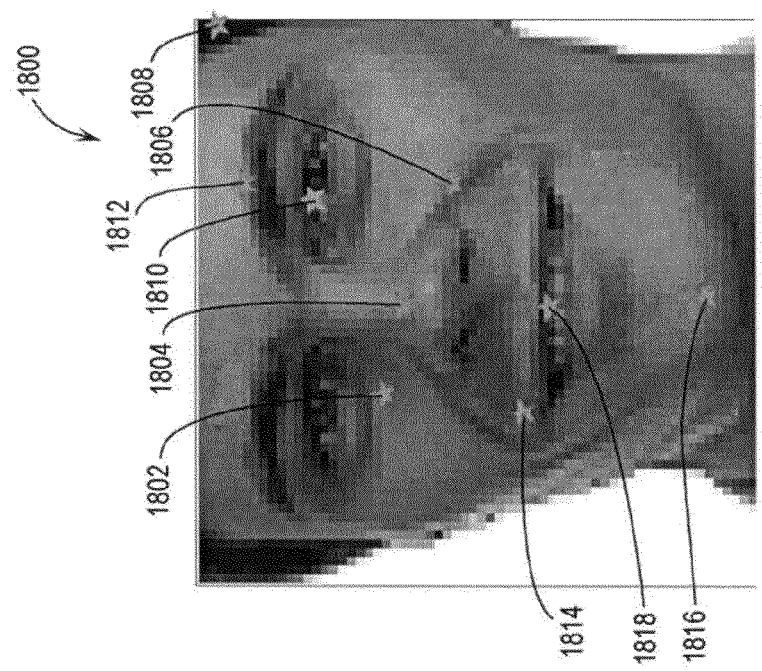
FIG. 18 is a 2-dimensional plot of an example distribution, by physical location over an example facial image sample, of the top 9 features selected during a facial image recognition training process.
Figure 17:
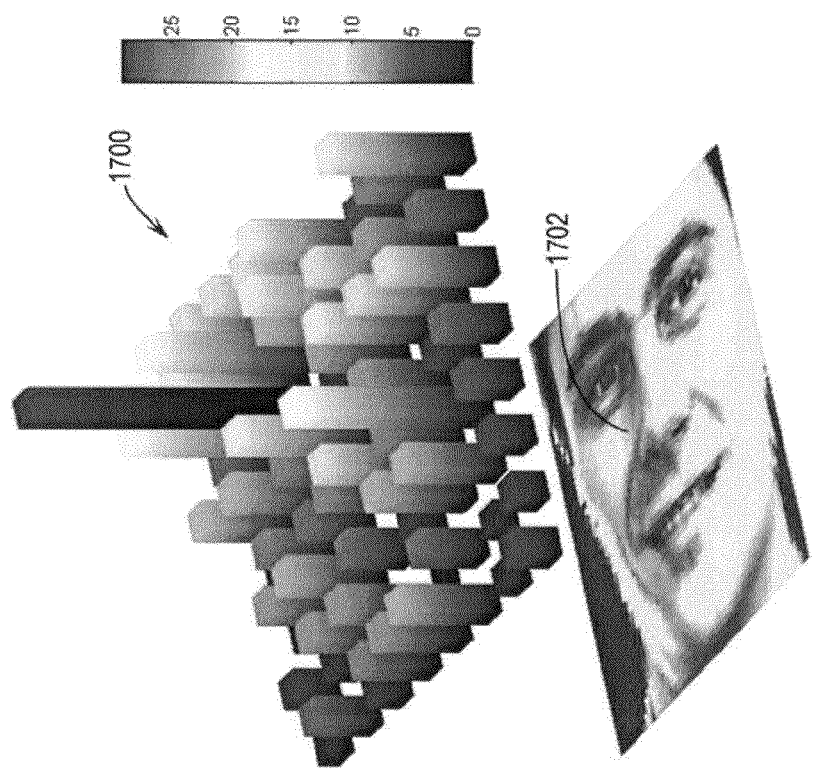
FIG. 17 is a 3-dimensional plot of an example distribution, by physical location over an example facial image sample, of the top 500 features selected during a facial image recognition training process.

FIG. 17 is a 3-dimensional plot 1700 of an example distribution, by physical location over an example facial image sample 1702, of the top 500 features selected during a facial image recognition training process; and FIG. 18 is a 2-dimensional plot 1800 of an example distribution, by physical location over an example facial image sample, of the top 9 features (labeled 1802 through 1818 in FIG. 18) selected during a facial image recognition training process. As shown in FIG. 17 and FIG. 18, most of the selected wavelet features are located in the vicinity of face features (eye, nose, and mouth, etc).

The confusion matrices for both training and testing phases are shown below at Table 2 and Table 3, respectively. While for the training set, AdaBoost gives a perfect classification, for the testing set, AdaBoost give classification error of 12.18% (=48/(346+48)) for poor quality faces and of 19.53% (=50/(50+206)) for good quality faces.

TABLE 2

Training Phase Confusion Matrix

|  |  | Predicted | |
| --- | --- | --- | --- |
|  |  | poor | good |
| True | poor | 586 | 0 |
|  | good | 0 | 414 |

TABLE 3

Testing Phase Confusion Matrix

|  |  | Predicted | |
| --- | --- | --- | --- |
|  |  | poor | good |
| True | poor | 346 | 48 |
|  | good | 50 | 206 |

Figure 20:
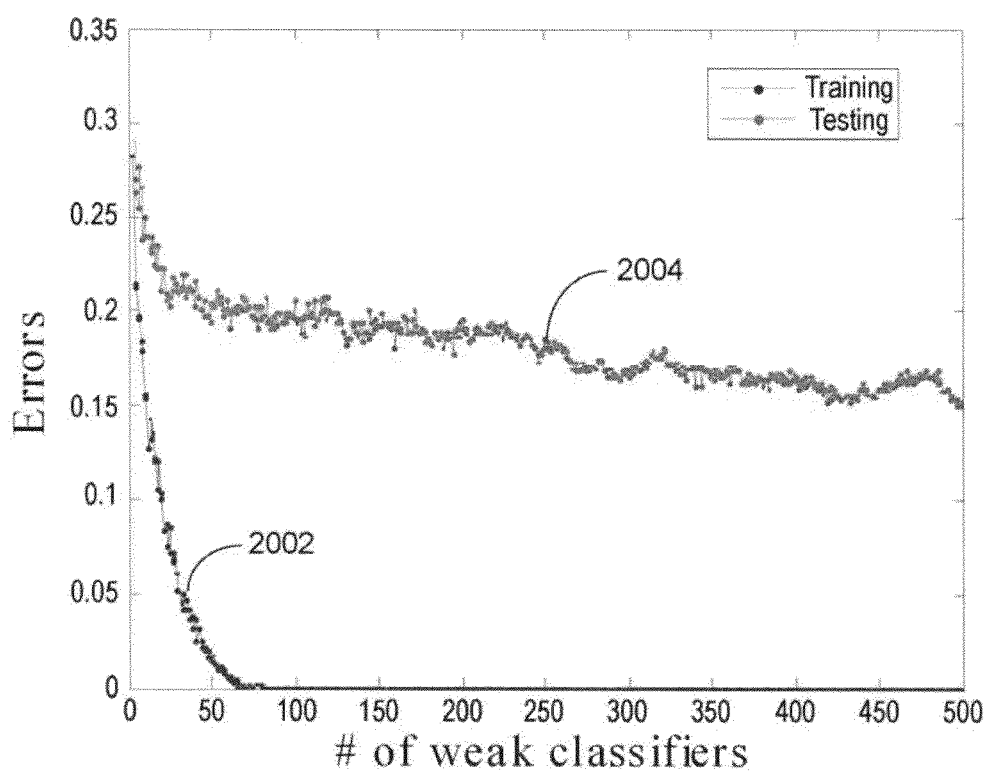
FIG. 20 is a plot of training errors and testing errors as a function of the number of weak classifiers, based on the results of an experimental test.

FIG. 20 shows a plot 2002 of training errors as a function of the number of weak classifiers and a plot 2004 of testing errors as a function of the number of weak classifiers, based on the results of an experimental test. As shown in FIG. 20, as the number of weak classifiers increases, both the training and test errors decrease. However, the training error decreases much faster (to zero after about 60 weak classifiers) while the testing error is still about 0.17 at the number of weak classifiers equal to 500. As been observed, a boosted classifier is less likely to be overfitted, using more weak classifiers should expect a further reduction of the testing errors.

To measure the performance of AdaBoost classifier and overall quality estimation scheme, Kappa statistics were also calculated. Originally used as a measure of agreement between observers of psychological behavior, Kappa statistics, also called Cohen's kappa, are an indication of how much prediction improvement over the predictions that might occur by chance and has been used as a robust alternative measure for reporting classification performance. Cohen's kappa is defined by equation 3, below.

$$K = \frac{P_0 - P_c}{1 - P_c} \quad \text{Equation 3}$$

where $P_0$ is the total agreement probability and $P_c$ is the probability that the "agreement" occurred by chance, both of which are further defined in terms of confusion matrix, x, in equation 4 and equation 5, as follows.

$$P_0 = \frac{1}{N} \sum_{i=1}^{c} x(i, i) \quad \text{Equation 4}$$

$$P_c = \frac{1}{N^2} \sum_{i=1}^{c} x(i, \cdot) x(\cdot, i) \quad \text{Equation 5}$$

where x(i,i) is the count of cases in the main diagonal, N is the number of examples, c is the number of classes, and x(i,•) & x(•,i) are the row and column sums of the confusion matrix, respectively.

Such defined kappa statistic have values from −1 to 1, where kappa of −1 indicates a total disagreement, kappa of 0 indicates a random classification, and kappa of +1 indicates a total agreement. For the confusion matrices shown in Table 2 and Table 3, the kappa values are 1.0 and 0.684 for training and testing sets, respectively, which is considered as good performance.

For purposes of explanation in the above description, numerous specific details are set forth in order to provide a thorough understanding of the described biometric sample training device, biometric sample quality assessment device, biometric fusion recognition device, integrated biometric fusion recognition system and example processes in which each may be used. It will be apparent, however, to one skilled in the art that the described biometric sample recognition techniques that use wavelets and boosted classifier processing may be practiced without these specific details. In other instances, well-known structures and devices are shown in block diagram form in order to avoid obscuring the features of the described biometric sample recognition techniques.

While the described biometric sample recognition techniques that use wavelets and boosted classifier processing has been described in conjunction with specific embodiments thereof, it is evident that many alternatives, modifications, and variations will be apparent to those skilled in the art. Accordingly, embodiments of the biometric sample recognition techniques, as set forth herein, are intended to be illustrative, not limiting. There are changes that may be made without departing from the spirit and scope of the invention.

What is claimed is:

1. A method of training a biometric sample quality assessment device, comprising:
   receiving a plurality of gallery training samples of a common biometric sample type;
   receiving a plurality of probe training samples of the common biometric sample type;
   performing a convolution of each probe training sample with a set of wavelets to generate a plurality of wavelet features for each probe training sample;
   generating a match indicator for each probe training sample that indicates a degree of confidence on matching the probe training sample to one of the plurality of gallery training samples;
   processing the match indicator and wavelet features for each probe training sample with a boosted classifier to identify a subset of the plurality of wavelet features and a set of boosted classifier classification rules;
   storing a list that identifies the subset of the plurality of wavelet features to the biometric sample quality assessment device; and
   storing the set of boosted classifier classification rules to the biometric sample quality assessment device.

2. The method of claim 1, wherein the set of wavelets is a set of Gabor wavelets and the generated plurality of wavelet features is a plurality of Gabor wavelet features.

3. The method of claim 1, wherein the boosted classifier is an AdaBoost classifier.

4. A training device for training a biometric sample quality assessment device, comprising:
   a gallery sample data store that receives a plurality of gallery training samples of a common biometric sample type;
   a probe sample data store that receives a plurality of probe training samples of the common biometric sample type;
   a wavelet feature extraction module that performs a convolution of each probe training sample with a set of wavelets to generate a plurality of wavelet features for each probe training sample;
   a biometric sample recognition engine that generates a match indicator for each probe training sample that indicates a degree of confidence on matching the probe training sample to one of the plurality of gallery training samples; and
   a classification engine module that processes the match indicator and wavelet features for each probe training sample with a boosted classifier to identify a subset of the plurality of wavelet features and a set of boosted classifier classification rules.

5. The training device of claim 4, wherein the set of wavelets is a set of Gabor wavelets and the generated plurality of wavelet features is a plurality of Gabor wavelet features.

6. The training device of claim 5, wherein the boosted classifier is an AdaBoost classifier.

* * * * *